United States Patent [19]

Gapp et al.

[11] 3,975,786
[45] Aug. 24, 1976

[54] METHOD OF FORMING A RIVET OF TITANIUM-COLUMBIUM ALLOY

[75] Inventors: Roland Howard Gapp, South Laguna; Rahmatollah Fakhri Toosky, Laguna Hills; Ira Bill Lee York, Costa Mesa, all of Calif.

[73] Assignee: Textron, Inc.

[22] Filed: June 26, 1975

[21] Appl. No.: 590,693

Related U.S. Application Data

[62] Division of Ser. No. 329,590, Feb. 5, 1973, Pat. No. 3,911,783.

[52] U.S. Cl. .............................................. 10/27 E
[51] Int. Cl.² ........................................... B21K 1/58
[58] Field of Search ............... 10/10 R, 11 R, 27 R, 10/27 E, 27 PH; 85/37, 38

[56] References Cited
UNITED STATES PATENTS

| | | | |
|---|---|---|---|
| 2,027,980 | 1/1936 | Horton | 10/27 E |
| 3,072,933 | 1/1963 | Carlson | 10/27 E |
| 3,126,561 | 3/1964 | Orloff | 10/11 R |
| 3,526,032 | 9/1970 | Pipher | 85/37 |
| 3,626,531 | 12/1971 | Mazer et al. | 10/27 E |
| 3,848,389 | 11/1974 | Gapp et al. | 85/37 X |

*Primary Examiner*—C.W. Lanham
*Assistant Examiner*—E. M. Combs
*Attorney, Agent, or Firm*—George B. White

[57] ABSTRACT

A high strength buckable rivet made of an alloy consisting of titanium and columbium, the optimum proportion being about 55% titanium and about 45% columbium. The method of making this rivet includes the steps of cold forming a cylindrical blank so as to form a head and shank of the rivet and cold working the head and a portion of a shank of the rivet so as to leave a ductile tail portion capable to form a buck tail, the optimum length of the ductile portion being about 0.8 times the diameter of the rivet shank.

4 Claims, 10 Drawing Figures

METHOD OF FORMING A RIVET OF TITANIUM-COLUMBIUM ALLOY

This is a division of application Ser. No. 329,590 filed Feb. 5, 1973, now U.S. Pat. No. 3,911,783.

BACKGROUND OF THE INVENTION

An alloy made of titanium and columbium has been previously used only for its superconducting properties in the electronic industry, but not as structural or fastener material. The problem was to provide a fastener of light weight, superior comparable shear strength and a readily buckable tail.

Considering the rivet applications, for instance, in 6A1-4V and CP titanium sheets, previously the following disadvantage occurred:

Aluminum rivets cannot be used, although they are easy to upset and are light in weight, because they rapidly corrode in the more noble titanium sheet, and because aluminum rivets cannot be used at temperatures above approximately 350°F, and the strength values of such aluminum rivets are relatively too low.

Monel rivets are used at strength levels of 50 KSI shear, but they are heavy compared to the weight of such sheets and they are harder to upset and distort thin sheets.

CP titanium rivets can be used and they are even lighter, but they cause unacceptable sheet distortion in thin sheets and they are appreciably more difficult to upset thus requiring heavier rivet guns and bucking bars which result in greater operator fatigue, which is a very important factor and are difficult to upset in hard-to-get-at places where bucking bars of less than ideal shape have to be used.

A-286 rivets were tried as they are stronger at room temperature and also at elevated temperature up to 1300°F, however they are much heavier and are very hard to drive and distort thin sheets very badly.

Several so-called Beta alloys of Titanium were tried but the driving was unacceptably hard and such rivets were heavy.

In applications in aluminum sheets such as 2024T3 and 7075T6, heretofore cadmium plated Monel solid rivets were used as well as CP titanium solid rivets which would have satisfactory design shear strength. The major known use of such Monel and CP solid rivets in an aluminum aircraft structure is in the Anglo-French Concorde. In this use CP titanium was substituted for Monel to save weight, but CP titanium increases the corrosion rate of aluminum in salt spray environments and although the CP titanium rivets are installed with wet zinc chromate primer, or other anti-corrosion insulating coating, applied to the rivet or hole, it is not accepted as the complete answer because the primer in actual practice either incompletely covers the aluminum surface or is dry at the time the rivet is installed and flakes off. Furthermore, accelerated galvanic corrosion of the aluminum takes place which is apt to cause looseness of the joint. Furthermore the CP titanium may absorb hydrogen from the galvanic action, hydrides may form and the rivet may fail.

So far as one of the methods of cold working is concerned, the closest reference of which applicant is aware is U.S. Pat. No. 3,626,531 issued on Dec. 14, 1971 to M. R. Mazer, et al., which patent, however, is concerned with the rivets made of material heretofore enumerated in previous use, and the steps do not provide for a predetermination of the ductile tail length. In applicant's method substantially the entire grip length of the rivet is work hardened so as to result in the particular ratio between the unworked ductile tail portion and the diameter of the rivet shank.

Applicant's particular rivet is not only light but it has superior shear strength proportioned to the grip length of the rivet and it fulfills a need which no other solid rivet heretofore accomplished. The rivets of the herein application are unique in that they provide the necessary shear strength, yet they are easier to drive than any other rivet of comparable shear strength; the herein rivets may be driven in thin sheets without sheet distortion, maintain their strength and ductility very well at temperatures up to 800°F; their strength and ductility and other physical properties are stable based on tests up to 1000 hours at 800°F; because of the ease of driving, smaller rivet hammers and bucking weights can be used, operator fatigue is reduced, and rivets may be used in hard-to-get-at places with bent or other less than ideal bucking bar shapes, without resulting in lopsided bucked rivet heads. It was found that after prolonged exposure at 800°F the herein rivets actually agehardened and became stronger. For instance, after 244 hours at 800°F, 89% cold worked rivets of this material had a tensile strength of 130 KSI with an elongation value of 24% compared to its initial strength of 86 KSI at 24% elongation. This aging factor in some cases can become very important. The herein rivets made in accordance with the herein method solve the corrosion problem even in the uncoated condition.

DETAILED DESCRIPTION

Figure 2:
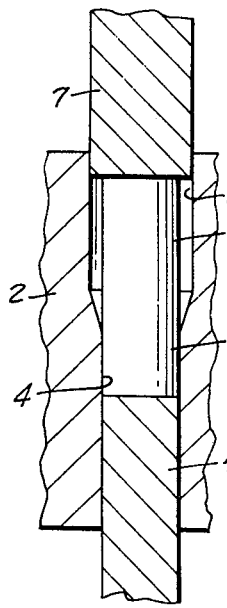
FIG. 2 shows the rivet blank introduced into a die.

The blank 1 is made of a slug of material of a titanium columbium alloy herein described and it is cut off of a piece of wire in a cold forming header. This blank is then introduced into a die 2 as shown in FIG. 2. The shank end 3 of the blank 1 enters into a shank cavity 4 which is slightly larger in diameter than the blank 1. The blank rests on a knock-out pin 5. The major portion of the blank is contained in a larger or head cavity 6 open to the top to permit the insertion of the blank 1. The diameter of this head cavity 6 is at least 30% larger than the diameter of the shank cavity 4. A punch 7 fits into the larger head cavity 6 and as it is pressed downward it compacts the material of the shank 1 into the larger head cavity 6 in the manner illustrated in FIG. 4. The shank end portion 3 of the initial blank 1 is held so that it cannot expand any further than the restricted shank cavity 4, while the upper end of the blank 1 swells to fill out in the head cavity 6 of the upper portion of the die. This results in appreciable cold forming of the rivet blank into a head 8 and a frusto-conical portion 9 conforming to the shape of the enlarged head cavity 6. The frusto-conical portion 9 has a progressively decreasing amount of cold forming starting at its intersection with the head 8 and traveling toward its intersection with the end shank section 3.

Figure 1:
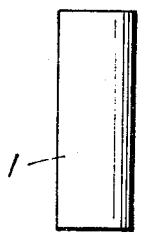
FIG. 1 is a cylindrical blank for the rivet.
Figure 3:
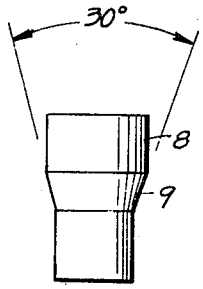
FIG. 3 shows the rivet with the initial forming of the head.
Figure 5:
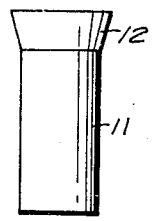
FIG. 5 shows the completed rivet outside of the die.
Figure 4:
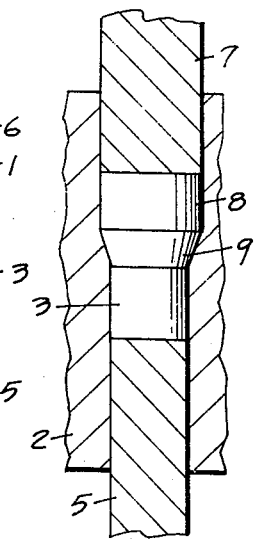
FIG. 4 shows the position of the rivet in the condition of FIG. 3 within the die.
Figure 6:
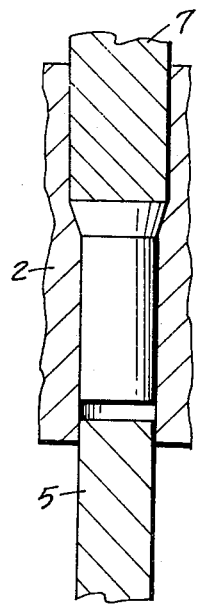
FIG. 6 represents the completed rivet still within the die after the cylindrical shank cavity length of the die has been increased.
Figure 8:
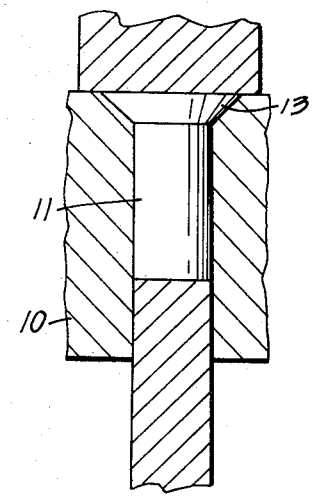
FIG. 8 represents the rivet of FIG. 7 inside of the die.

After the blank 1 has been formed to the condition shown in FIGS. 3 and 4 the knock-out pin 5 is lowered or withdrawn to a floating position as shown in FIG. 6 and the punch 7 is advanced further into the head cavity 6 thereby to force the blank 1 further into the shank cavity 4 of the die as shown in FIG. 6. This results in appreciable working again of the material in the frustoconical section 9 and in the material of the head 8 of FIG. 4. The rivet so worked is then ejected from the die by withdrawing the punch and pushing up the knock-out pin 5 and the product will appear as shown in FIG. 5.

The included angle of the frusto-conical section 9 as illustrated in FIG. 3 is approximately 30°. This angle is most generally used for an easy extrusion angle to accomplish the cold working of the blank from the shape shown in FIG. 3 to the shape shown in FIG. 5. It is possible, however, to use angles of other than 30° and it would be possible to use, for instance, an angle of 100°. The blank resulting from the forming operations in a single die 2 results in a rivet shaft 11 and a head 12 of 30° included angle as shown in FIG. 5.

If the larger angle of up to 100° is not used in the previous forming operation, then it will be necessary only to transfer the blank of FIG. 5 to a second die 10 in which the shank 11 of the rivet is held fixed while the head 12 is reformed to a new shape 13.

After the rivet is formed to the desired finished shape it is subjected to an aging treatment which will increase the tensile and shear strength of all of the material which has been appreciably cold worked but which has little or no effect on the unworked shank end 3 of the rivet. The preferred aging treatment consists of subjecting the entire rivet to a temperature of 800°F for approximately five hours while held in a vacuum of approximately $10^{-4}$ torr. As a result of such treatment, shear strength of the cold formed blank portion will increase to approximately 60,000 psi and the unworked shank end 3 of the blank retains its initial shear strength of approximately 50,000 psi and also retains its initial ductility so that it may be readily formed into a buck tail.

Figure 7:
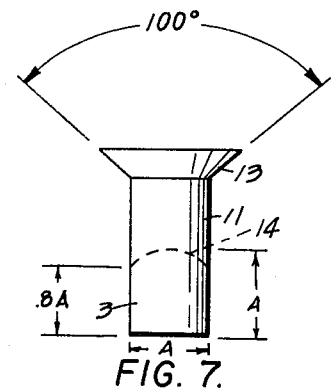
FIG. 7 represents a rivet with a frusto-conical section of larger included angle.

In order to obtain the proper amount of material to form a buck tail, it is preferable that the length of the unworked shank end 3 be approximately 0.8 times the diameter of the rivet shank. For instance, for a ¼ inch diameter rivet the length of unworked shank end 3 would be 0.8 x ¼ inches or 0.200 inch. It was found that in the finished rivet the portion of the rivet which is not cold formed is substantially the length of the shank end 3 in the end of the shank cavity 4 in FIG. 4. However, the length unaffected by cold forming extends axially into the work shank 11 in a substantially spherical segment shape as indicated by the broken line 14 in FIG. 7.

Figure 10:
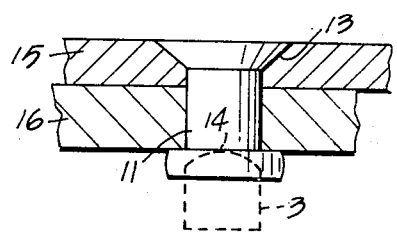
FIG. 10 illustrates the installation of this rivet wherein substantially all the unhardened material extends below the lower plate.
Figure 9:
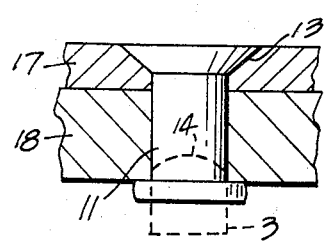
FIG. 9 shows the rivet installed in its recommended grip.

The length of the unworked shank end 3 as above determined is such that during the installation of the finished rivet into work plates 15 and 16, as shown in FIG. 10, initially substantially all of the unhardened shank end 3 extends below the lower plate 16. This projecting length is substantially equivalent to the diameter of the shank of the rivet. In FIG. 9 is illustrated the installing of the same rivet in its maximum recommended grip, wherein the rivet shank end 3 extends only partially, for instance as much as 1/16 inch less than the rivet diameter, yet it provides sufficient material to form a satisfactory buck tail to rivet together the plates 17 and 18. In either case, the major portion of the shank of the rivet is in the cold worked and hardened condition and is therefore able to withstand higher shear loads than would be possible with the initially annealed material.

While the optimum proportion for airplane rivets is 55% titanium and 45% columbium, nevertheless a range of 50% to 75% titanium may prove satisfactory. Less percentage of titanium would reduce the required upset loads but would increase the weight. Some increase in columbium content may improve temperature properties.

One theory for the increasing in tensile and shear strength of rivets of this material with no increase in required upset loads, is due to a "texturing" effect within the material of the rivet treated as herein described which makes it perform like a composite material, consisting of a soft matrix with high tensile longitudinal fiber reinforcing. Such a rivet has high tensile and shear strength due to the strong reinforcing fibers, but in endwise compression would have low strength.

We claim:
1. A method of forming a rivet comprising,
preparing an integral cylindrical blank of an alloy consisting essentially of about 55% titanium and about 45% columbium and of substantially uniform diameter,
locating said blank in a die bore having a cylindrical portion of slightly larger diameter than that of said blank, and an enlarged portion at one end of the cylindrical portion conforming to the shape of a rivet head,
placing an abutment in said cylindrical portion spaced from the enlarged portion to a distance equal to the length of a ductile tail of a rivet,
cold forming into a rivet head the entire blank portion in said enlarged portion,
removing said abutment from the end of said blank,
further cold working said rivet head by extrudng a predetermined portion of said head into said cylindrical bore to form a shank having a first portion work hardened to a predetermined length, and a second portion comprising a ductile tail of a length, approximately 0.8 to 1.00 of the diameter of said shank which is capable of being formed into a buck tail.
2. The method specified in claim 1, and age-hardening said rivet.
3. The method specified in claim 1, and age-hardening said rivet by subjecting said rivet to a temperature of about 800°F for approximately 5 hours while held in a vacuum of approximately $10^{-4}$ torr.
4. The method specified in claim 1, and said shank being cold worked to such a length that the ductile portion remaining is approximately 0.8 times the diameter of the shank.

* * * * *